United States Patent [19]
Edouart

[11] 3,857,294
[45] Dec. 31, 1974

[54] ADJUSTABLE LENGTH ENDLESS TRANSMISSION BELT

[76] Inventor: Robert F. Edouart, P.O. Box 1, Malibu, Calif. 90265

[22] Filed: Oct. 5, 1972

[21] Appl. No.: 295,139

[52] U.S. Cl. ............................... 74/231 J, 24/31 C
[51] Int. Cl. ............................................. F16g 5/00
[58] Field of Search .................. 74/231 J, 238, 237; 24/31 C

[56] References Cited
UNITED STATES PATENTS

| | | | |
|---|---|---|---|
| 2,945,390 | 7/1960 | Bush | 74/237 |
| 2,995,045 | 8/1961 | Marty | 24/31 C |
| 3,058,680 | 10/1962 | Peterson et al. | 74/238 |
| 3,076,736 | 2/1963 | McHugh | 74/231 J |
| 3,186,048 | 6/1965 | Tann | 24/31 C |
| 3,245,276 | 4/1966 | Wall | 74/237 |
| 3,501,971 | 3/1970 | Peterson | 74/231 J |
| 3,744,095 | 7/1973 | Tomlinson | 74/231 J |

FOREIGN PATENTS OR APPLICATIONS

| | | | |
|---|---|---|---|
| 1,049,773 | 10/1957 | Germany | 74/237 |

*Primary Examiner*—Charles J. Myhre
*Assistant Examiner*—R. H. Lazarus
*Attorney, Agent, or Firm*—Harris, Kern, Wallen & Tinsley

[57] ABSTRACT

An endless transmission belt comprising a tubular belt of polymeric material cuttable to any desired length and a coupling means for locking together opposite ends of the belt. The coupling means includes an axially compressible-radially expandable and axially expandable-radially compressible sleeve on an inner wall of the tubular belt and an elongated flexible coupler having end portions adapted to fit into the sleeve at opposite ends of the belt and to be tightly gripped thereby upon axial expansion of the sleeve.

12 Claims, 16 Drawing Figures

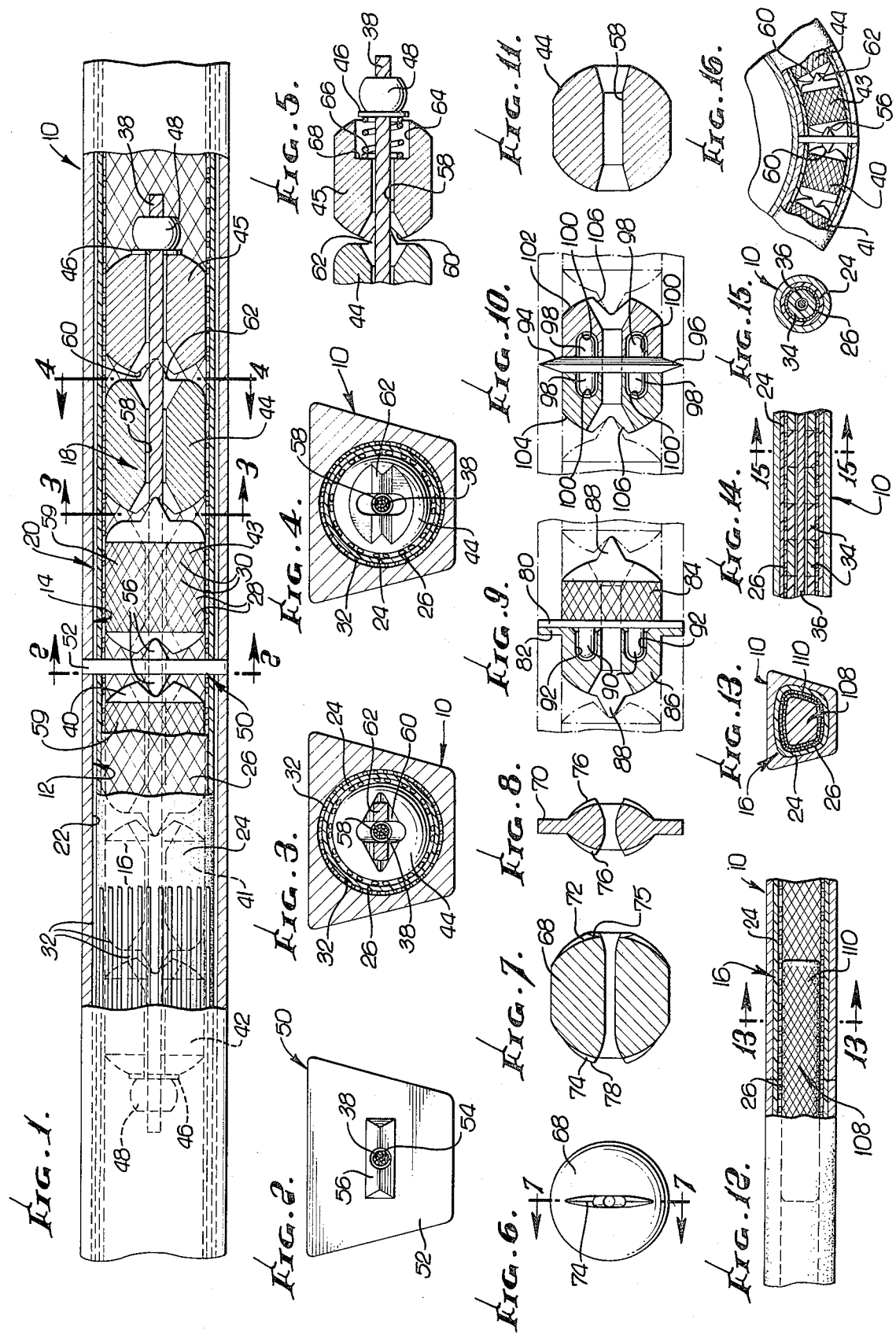

ADJUSTABLE LENGTH ENDLESS TRANSMISSION BELT

The present invention relates to endless transmission belts and, more particularly, to a novel transmission belt which may be formed to any desired length from a longer belt as by cutting and locking together opposite ends of the belt with a unique coupling means.

Nearly all transmission belts in use today are of a continuous fixed length variety. There is no adjustability in length other than the minor amount of expansion and contraction inherent in the polymeric materials generally utilized in the formation of such belts. Accordingly, when replacement of a transmission belt, such as an automobile fan belt, washing machine drive belt, and the like is required, it is necessary first to disassemble one of the pulleys around which the belt travels or loosen and move the motor mount to which one or more of the pulleys is connected. Usually, these are very difficult and time-consuming tasks.

In an attempt to overcome such transmission belt replacement problems, various adjustable length transmission belts have been developed. Such belts are formed to predetermined lengths, trained around an array of pulleys and opposite ends thereof connected to form the desired endless belt. In the past, such belts have taken the forms of a series of links secured together by separate couplers, such as described in U.S. Pat. No. 2,969,686, or a tubular polymeric belt-plug coupling assembly such as described in U.S. Pats. Nos. 3,461,733 and 3,501,971.

The link-type transmission belt is relatively expensive, time-consuming to assemble, and the length adjustability thereof is limited by the length of the individual links. Further, with use the couplers tend to tear the links and provide a rough belt surface for travelling over pulleys and the like.

The tubular belt-plug coupling assembly suffers from serious wear problems in the area of the coupling and possesses a relatively short useful life, particularly under relatively high load conditions. In that regard, the plug assembly includes sharp annular projections for cutting into the inner walls of the tubular belt to lock opposite ends of the belt together. As such a belt is driven around a pulley, the projections cut farther and farther into and tear the belt in the coupling area.

In view of the foregoing, it is an object of the present invention to provide an improved adjustable length, endless transmission belt including a tear-free coupling for opposite ends thereof.

Another object of the present invention is to provide an endless transmission belt of the foregoing character in which the coupling includes axially compressible-radially expandable and axially expandable-radially compressible sleeves secured to inner walls of cavities in opposite ends of the belt to receive and tightly lock to an elongated flexible coupler.

A further object of the present invention is to provide an endless transmission belt of a foregoing character wherein the sleeve comprises a series of axially spaced helical strands curling in a first direction and intertwined with a similar series of axially spaced helical strands curling in an opposite direction to form a woven mesh and wherein the coupler includes and carries on its outer surface a similar open mesh pattern for locking tightly with the woven mesh upon insertion into opposite ends of the belt.

Still another object of the present invention is to provide an endless transmission belt of the foregoing character including means in the coupler for limiting bending thereof to a plane of the endless belt.

The foregoing as well as other objects and advantages of the present invention may be more clearly understood by reference to the following detailed description when considered with the drawing which, by way of example only, illustrates an endless transmission belt including various coupling means embodying the features of the present invention. In the drawing:

FIG. 1 is a side view of a portion of an endless transmission belt with portions broken away to illustrate the inner construction thereof including coupling means for locking together opposite ends of the belt, the coupling means including an axially compressible-radially expandable and axially expandable-radially compressible sleeve secured to an inner wall of the tubular belt to receive an elongated flexible coupler;

FIG. 2 is an end view of a center stop included in the coupler illustrated in FIG. 1 as viewed along the line 2—2;

FIG. 3 is a cross-sectional view taken along the line 3—3 in FIG. 1 showing the inner construction of the transmission belt looking to the right between adjacent beads included in the coupler;

FIG. 4 is a cross-sectional view taken along the line 4—4 in FIG. 1 showing the inner construction of the transmission belt looking to the left between adjacent beads included in the coupler;

FIG. 5 is a sectional side view of an end portion of a modified form of coupler including a coil spring for continuously urging beads included in the coupler in an axial direction and allowing for axial movement of the beads when the coupler bends with the transmission belt;

FIG. 6 is an end view of a modified form of a bead for use in the coupler for the transmission belt;

FIG. 7 is a cross-sectional side view taken along the line 7—7 in FIG. 6 illustrating the inner construction of the bead;

FIG. 8 is a sectional side view of an alternate form of center stop included in a coupler comprising a series of beads as shown in FIG. 6 and 7 on a cable as illustrated in FIG. 1;

FIG. 9 is an alternate form of center stop for a coupler including means for connecting together opposite ends of a split bead;

FIG. 10 is a sectional side view of still another form of center stop for a coupler for connecting together opposite ends of a split bead;

FIG. 11 is a sectional side view of still another form of bead which may be incorporated in the coupler for securing together opposite ends of the transmission belt;

FIG. 12 is a side view partially in section illustrating the inner construction of another form of transmission belt constructed in accordance with the present invention and including a solid flexible coupler for securing together opposite ends of the belt;

FIG. 13 is a cross-sectional view taken along the line 13—13 in FIG. 12 illustrating the inner construction of the transmission belt;

FIG. 14 is a sectional side view of a portion of a tubular transmission belt including therein a series of beads on a cable for reinforcing the side walls of the belt to prevent radial compression thereof.

FIG. 15 is a cross-sectional view taken along the line 15—15 in FIG. 14; and

FIG. 16 is a fragmentary sectional side view of a transmission belt similar to that shown in FIG. 1 illustrating the manner in which the transmission belt bends around a pulley in the area of the coupling between opposite ends of the belt.

To accomplish the foregoing objects, the transmission belt of the present invention comprises an elongated belt 10 having cavities 12 and 14 in opposite ends thereof. The belt 10 may have a V, trapezoidal, or circular cross section and the cavities may be formed by the belt having a tubular construction. Preferably, the belt is formed of a polymeric material and is cuttable to any desired length. To secure opposite ends of the belt 10 together and to thereby form a continuous transmission belt, coupling means 16 is included. Basically, the coupling means includes an elongated flexible coupler 18 and an axially compressible-radially expandable and axially expandable-radially compressible sleeve 20 secured to an inner wall 22 of each of the cavities. The coupler 18 possesses a circumference slightly larger than the normal inner circumference of the sleeves and includes opposite end portions for insertion into the sleeves for tear-free gripping thereby.

More particularly, as illustrated in FIGS. 1 and 12, the sleeve 20 preferably comprises a sleeve of soft, elastomeric material 24 secured to the inner wall 22 of each cavity and having embedded in an inner surface thereof a woven mesh 26 comprising a series of axially spaced helical strands 28 curling in a first direction and intertwined with a similar series of axially spaced helical strands 30 curling in an opposite direction. Such a configuration possesses the axial compression-radial expansion and axial expansion-radial compression qualities so important in the tear-free coupling means of the present invention. The strands 28 and 30 included in the sleeve 20 may be braided polyester fibers having a high tensile strength. If desired, axial reinforcing may be provided for the sleeve 20 and the belt 10 by a plurality of circumferentially spaced reinforcing strands 32 of braided form embedded in and extending axially along the inner walls of the belt just outside the sleeve. The strands 32 may possess a braided "locking angle" to help maintain the axial-circumferential dimensions of the belt under load conditions. In addition, radial reinforcing for the belt may be provided by a series of axially removable beads 34 on an elongated cable 36 as shown in FIGS. 14 and 15. Such a configuration is particularly useful in small tubular belts having narrow side walls.

Because of the elastomeric properties of the sleeve 24, and the relative size of the coupler 18, as the coupler is inserted into the cavities 12 and 14, the mesh 26 compresses axially. As the mesh compresses, it radially enlarges to more easily receive the ends of the coupler. When the inward motion of the coupler halts, the elastomeric sleeve 24 exerts a return force of the mesh 26 causing the mesh to axially expand and radially collapse to tightly grip the outer surface of the coupler. The gripping action is further increased upon axial tensioning of the sleeve as when the belt 10 is in operation and travelling around one or more pulleys.

Various forms of couplers are illustrated in the drawing. In FIG. 1 the coupler 18 comprises length of axially strong flexible cable 38, a plurality of beads 40–45, two end washers 46, two ball crimps 48, and a center stop 50. The center stop 50 comprises a plate 52 having a shape conforming to the cross section of the belt, here trapezoidal, and including a central hole 54 for receiving the cable 38. Lateral, substantially V-shaped projections 56 extend from opposite sides of the plate 50 transverse to and intersecting along their apex, a longitudinal axis of the hole 54. The projections combine with adjacent ones of beads to provide means for limiting bending of the coupler to the plane of the continuous belt, as hereinafter described.

The beads 40–45 are generally cylindrical in shape having rounded ends and central longitudinally extending openings 58 for receiving the cable 38. The outer surface of each bead carries an open mesh pattern 59. For example, the open mesh may comprise either a series of axially spaced helical strands curling in a first direction and intertwined with a similar series of axially spaced helical strands curling in an opposite direction, or such an arrangement of grooves. In both instances, the mesh is adapted to mate with the woven mesh 26 on the inner surface of the sleeve 24 to tightly lock the beads to the sleeve upon a relaxation of the soft elastomeric material as previously described.

In the coupler shown in FIG. 1, three beads 40, 41, and 42 are located on one side of the center stop 50 and the remainder 43, 44, and 45 on the other. A washer 46 and ball crimp 48 are located at each end of the cable and bear tightly against the endmost beads 42 and 45 to secure the beads on the cable and to axially urge the beads toward the center stop 50.

Each of the beads 40–45 includes a lateral substantially V-shaped slot 60 in one end transverse to and intersecting along its apex the longitudinal axis of its central opening 58. Further each of beads 40, 41, 43, and 44 includes a lateral, substantially V-shaped projection 62 from an opposite end transverse to and intersecting along its apex the longitudinal axis of its central opening 58. The lateral projections 62 are designed to ride in the lateral slots of adjacent beads to limit the bending of the coupler to a plane of the continuous belt.

More particularly, in the configuration shown in FIG. 1, the beads 40–45 are arranged such that the lateral slots and projections extend in a plane substantially normal to the plane of the continuous belt. Further, slots 60 in the beads 40 and 43 receive the projections 56 from the center stop 50. Then in series, the beads to the right and left of the center stop are arranged such that the projections 62 are received in the slots 60 of the adjacent beads. The laterally extending ends of the projections normally engage the laterally extending bases of the slots. Therefore, any attempt to bend the coupler 18 in a plane other than the plane of the belt is resisted by the projections engaging the bases and sides of the slots.

Preferably, the lateral slots 60 are angularly larger than the projections 62. This permits the beads to pivot on the projections and the projections to axially slide on a side of the slots as the coupler bends in the plane of the continuous belt, as when the belt travels around a pulley (see FIG. 16). Such pivoting of the beads and axially sliding of the projections relieve much of the tension developed in the coupler 18 upon a bending thereof and allows the coupler to bend without increasing its over-all length. To further facilitate such a bending motion, opposite ends of the central openings 58 preferably are enlarged in the plane of the continuous belt as illustrated most clearly in FIGS. 1 and 3. Thus, the coupler 18 of FIG. 1 is free to bend in the plane of the belt 10, but is prevented from bending in any other plane.

FIG. 5 illustrates an additional feature that may be included in a coupler including beads as shown in FIG. 1 or beads as shown in FIG. 11. With beads of FIG. 11, the pivoting and axial sliding described and attributed to the projections in the lateral slots is not present. In such case, as well as in the embodiment of FIG. 1, it may be desired to provide means for relieving tension in the cable 38 by permitting axial movement of the beads as the coupler bends with the belt 10 around a pulley. To provide for such axial movement, a cavity 64 may be included in the endmost beads of the coupler for receiving a coil spring 66. The coil spring 66 bears on a base 68 of the cavity and on the washer 46 to continuously urge the beads toward the center stop 50 and to permit axial movement of the beads on the cable 38 as the coupler bends in the plane of the belt.

Alternate forms of a bead 68 and center stop 70 for a coupler similar to and possessing all the advantages and features of 18 are illustrated in FIGS. 6, 7, and 8. As shown, the bead 68 is more spherical in shape than those illustrated in FIG. 1 and includes a much narrower lateral V-shaped slot 72 and projections 74. The same is true of projections 76 from opposite side of the center stop 70. Further rather than lying in a plane substantially normal to the plane of the continuous belt, the lateral slots and projections 72 and 74 extend in a plane substantially parallel to the plane of the continuous belt to permit the beads to pivot on the projections in the slots and the projections to slide radially in the slots as the coupler bends only in the plane of the continuous belt. To assist in such a sliding-bending motion, the base 75 of the slot 72 is curved as is the outer surface 78 of the projection 74.

FIGS. 9 and 10 illustrate alternate forms of center stops for the coupler 18. In the form illustrated in FIG. 9, the center stop rather than comprising a separate plate with projections expending therefrom includes two annular flanges 80 and 82 extending radially from the outer surface of two half-beads 84 and 86 having V-shaped projections 88 from the outer ends thereof as previously described. The half-bead 84 includes two projections 90 from a right side thereof for fitting tightly into two sockets 92 in a left end of the half-bead 86. This arrangement locks the two half-beads together to define a center stop including projections from opposite sides thereof for engaging lateral V-shaped slots in adjacent beads of the coupler.

FIG. 10 discloses a center stop including a plate 94 having a pointed annular edge 96 and two projections 98 from either side for fitting into sockets 100 formed on the right and left faces respectively of two half-beads 102 and 104. This locks the two half-beads to the plate 94 with lateral substantially V-shaped slots 106 in the exposed ends of the half-beads adapted to receive V-shaped projections from adjacent beads in the coupler.

Still another and possibly a preferred form of coupler is illustrated in FIGS. 12 and 13. As shown, the coupler there comprises a length of solid polymeric material 108 having a circumferential dimension slightly larger than the inner circumference of the sleeve 24 and carrying on its outer surfaces an open mesh 110 for mating with the woven mesh 26. The coupler is flexible and resilient and is adapted to fit into the sleeve 24 to tightly lock opposite ends of the belt together in the manner previously described. The coupler may be circular in cross section or trapezoidal as illustrated in FIG. 13 to conform to the cross section of the belt in which it is included.

While various forms of couplers have been described for the coupling means of the endless belt, and while a particular form of endless belt has been described in some detail herein, changes and modifications may be made without departing form the spirit of the invention. Accordingly, it is intended that the present invention be limited in scope only by the terms of the following claims.

I claim:

1. An endless transmission belt comprising:
   an elongated transmission belt having cavities in opposite ends thereof; and
   coupling means for connecting together said opposite ends to form a continuous transmission belt, said coupling means including
   an axially compressible-radially expandable and axially expandable-radially compressible sleeve of soft elastomeric material secured to axially extending inner walls of each of said cavities,
   a sleeve of open cell mesh on an inner surface of said sleeve of soft elastomeric material including a series of axially spaced helical strands curling in a first direction and intertwined with a similar series of axially spaced helical strands curling in an opposite direction to form said open mesh, and
   an elongated flexible coupler having a circumferential dimension slightly larger than a normal inner circumferential dimension of said sleeve of soft elastomeric material for insertion into said sleeve of open cell mesh for gripping thereby upon axial expansion of said sleeves as by an axial tensioning of said belt, said coupler comprising
   a length of flexible cable,
   a plurality of beads including central openings for receiving said cable,
   means on opposite ends of said cable for retaining said beads thereon, and
   center stop means on said cable between particular ones of said beads for engaging said opposite ends of said belt as said beads on one side of said center stop are inserted into one of said cavities and beads on another side of said center stop are inserted into the other of said cavities, said beads being dimensioned to have a circumference slightly greater than the inner circumference of said sleeve of soft elastomeric material to be tightly gripped thereby upon an exertion of an axial force on said belt.

2. The transmission belt of claim 1 wherein each of said beads carries an open mesh pattern on an outer surface thereof for mating with said mesh of said sleeve to lock said coupler to said sleeve and hence to said belt.

3. The transmission belt of claim 1, wherein said openings in said beads for receiving said cable are enlarged at opposite ends thereof in a plane of said continuous belt to allow said cable to bend with said belt as it travels over a pulley.

4. The transmission belt of claim 1 wherein said coupler further includes spring means at opposite ends of said cable and bearing axially on endmost ones of said beads to urge said beads toward said center stop and to permit axial movement of said beads on said cable as said coupler bends with said belt as it travels over a pulley.

5. The transmission belt of claim 1 wherein said coupler further includes means on said center stop mating with beads adjacent thereto to releasably lock said adjacent beads to said center stop.

6. The transmission belt of claim 1 wherein said coupler further includes mating means on adjacent beads and on said center stop for limiting bending of said coupler to a plane of said continuous belt.

7. The transmission belt of claim 1 wherein said coupler includes a lateral, substantially V-shaped slot in one end of each bead transverse to and intersecting along its apex a longitudinal axis of its central opening and all but endmost ones of said beads on said cable including a lateral, substantially V-shaped projection from an opposite end of each bead transverse to and intersecting along its apex said longitudinal axis for riding in a V-shaped slot in an adjacent bead to limit bending of said coupler to a plane of saic continuous belt.

8. The transmission belt of claim 7 wherein said lateral slots and projections extend in a plane substantially normal to said plane of said continuous belt and said lateral slots are angularly larger than said projections to permit said beads to pivot on said projections in said slots and said projections to slide axially in said slots as said coupler bends in said plane of said continuous belt.

9. The transmission belt of claim 7 wherein said lateral slots and projections include curved bases and outer edges respectively and extend in a plane substantially parallel to said plane of said continuous belt to permit said beads to pivot on said projections in said slots and said projections to slide radially in said slots as said coupler bends in said plane of said continuous belt.

10. The transmission belt of claim 7 wherein said coupling means includes lateral substantially V-shaped projections from opposite sides of said center stop for riding in V-shaped slots in beads adjacent thereto.

11. An endless transmission belt comprising:
an elongated transmission belt having cavities in opposite ends thereof; and
coupling means for connecting together said opposite ends to form a continuous transmission belt, said coupling means including
a sleeve of soft elastomeric material secured to axially extending inner walls of each of said cavities and being axially compressible-radially expandable and axially expandable-radially compressible from a relaxed condition in said cavities,
a sleeve of open cell mesh on an inner surface of said sleeve of soft elastomeric material including a series of axially spaced helical strands curling in a first direction and intertwined with a similar series of axially spaced helical strands curling in an opposite direction to form said open mesh,
an elongaged flexible coupler having a circumferential dimension slightly larger than a normal inner circumferential dimension of said sleeve of soft elastomeric material for insertion into said sleeve of open cell mesh with an axial compression-radial expansion of said sleeve of soft elastomeric material, and
an open cell mesh pattern on an outer surface of said coupler for mating with said helical strands comprising said open mesh on said inner surface of said sleeve of soft elastomeric material to tightly lock said coupler in said sleeves.

12. The transmission belt of claim 11 wherein said belt is a tubular belt having a central cavity defining said end cavities and wherein said belt further includes radial reinforcing means including a plurality of reinforcing beads carried on a cable located in said central cavity for reinforcing side walls of said belt against radial compression.

* * * * *